July 15, 1958 L. W. FRANKLIN ET AL 2,843,660

FACSIMILE TELEGRAPH SYSTEM

Filed March 27, 1951 2 Sheets-Sheet 1

INVENTORS
L. W. FRANKLIN
M. J. REYNOLDS

BY

ATTORNEY

July 15, 1958 L. W. FRANKLIN ET AL 2,843,660

FACSIMILE TELEGRAPH SYSTEM

Filed March 27, 1951 2 Sheets-Sheet 2

INVENTORS
L. W. FRANKLIN
M. J. REYNOLDS

BY

M. J. Reynolds

ATTORNEY

United States Patent Office 2,843,660

Patented July 15, 1958

2,843,660

FACSIMILE TELEGRAPH SYSTEM

Laurence W. Franklin, Hasbrouck Heights, and Marvin J. Reynolds, Montclair, N. J., assignors to The Western Union Telegraph Company, New York, N. Y., a corporation of New York Application March 27, 1951, Serial No. 217,818

15 Claims. (Cl. 178—5.6)

This invention relates to facsimile telegraph systems and more particularly to the control of facsimile recording apparatus from a remote point.

The invention will be described with particular reference to the selection and operation of a facsimile recorder over an ordinary telephone system, but it is not limited to such usage, since many of the features thereof are equally applicable to any wire network or radio system.

One of the objects of the invention is to provide apparatus for selecting a facsimile or similar equipment for operation, over a telephone circuit without interference with the normal telephone service over such circuit.

Another object is to provide a system in which facsimile operation may be initiated in the absence of and without manual control of the subscriber or patron.

A still further object is to provide apparatus, in such a system, for restoring the system to normal following the recording of a facsimile message.

Still another object is to provide a signaling means for indicating the selection of the facsimile apparatus for operation.

Other objects and advantages will hereinafter appear.

In accordance with a preferred embodiment of my invention, I utilize the calling bell signal or ringing current of a telephone system in combination with other selective signals to operatively associate the facsimile receiving equipment with the telephone circuit. The selective operation of the equipment in response to the bell and other control signals series (1) to disconnect the telephone from the telephone circuit, (2) to connect the facsimile signal amplifier thereto, (3) to lock the system in the foregoing condition, (4) to connect the facsimile recorder to the local power source, if disconnected therefrom, (5) to connect the facsimile recorder to the facsimile signal amplifier, (6) to disconnect the facsimile recorder from the radio receiver, if so connected and following completion of the facsimile transmission, and (7) to restore the system to normal. Signaling means may also be operated to indicate either visually or audibly or both, the operative condition of the recorder. If desired, either or both signals may be maintained in operative condition until manually restored.

The invention will be fully understood by reference to the accompanying drawings, in which.

The invention has been illustrated with particular reference to the delivery of telegrams to unattended stations or to a subscriber in his absence, by the transmission of facsimile signals over the subscriber's telephone line and the recording thereof on suitable facsimile equipment. It has been proposed heretofore, to broadcast news and similar items by radio in the form of facsimile signals and to record them during normal idle periods of the radio reception, for instance, during the night, upon a suitable facsimile equipment associated with the radio receiver. The present invention aims to utilize the same facsimile equipment, normally employed for radio reception of facsimile signals, for the delivery of telegrams or other information from a central disseminating point to telephone subscribers equipped with such facsimile equipment. It is to be understood, however, that the invention is not limited to such service but may be employed for general news broadcasts and similar services.

Figure 1:
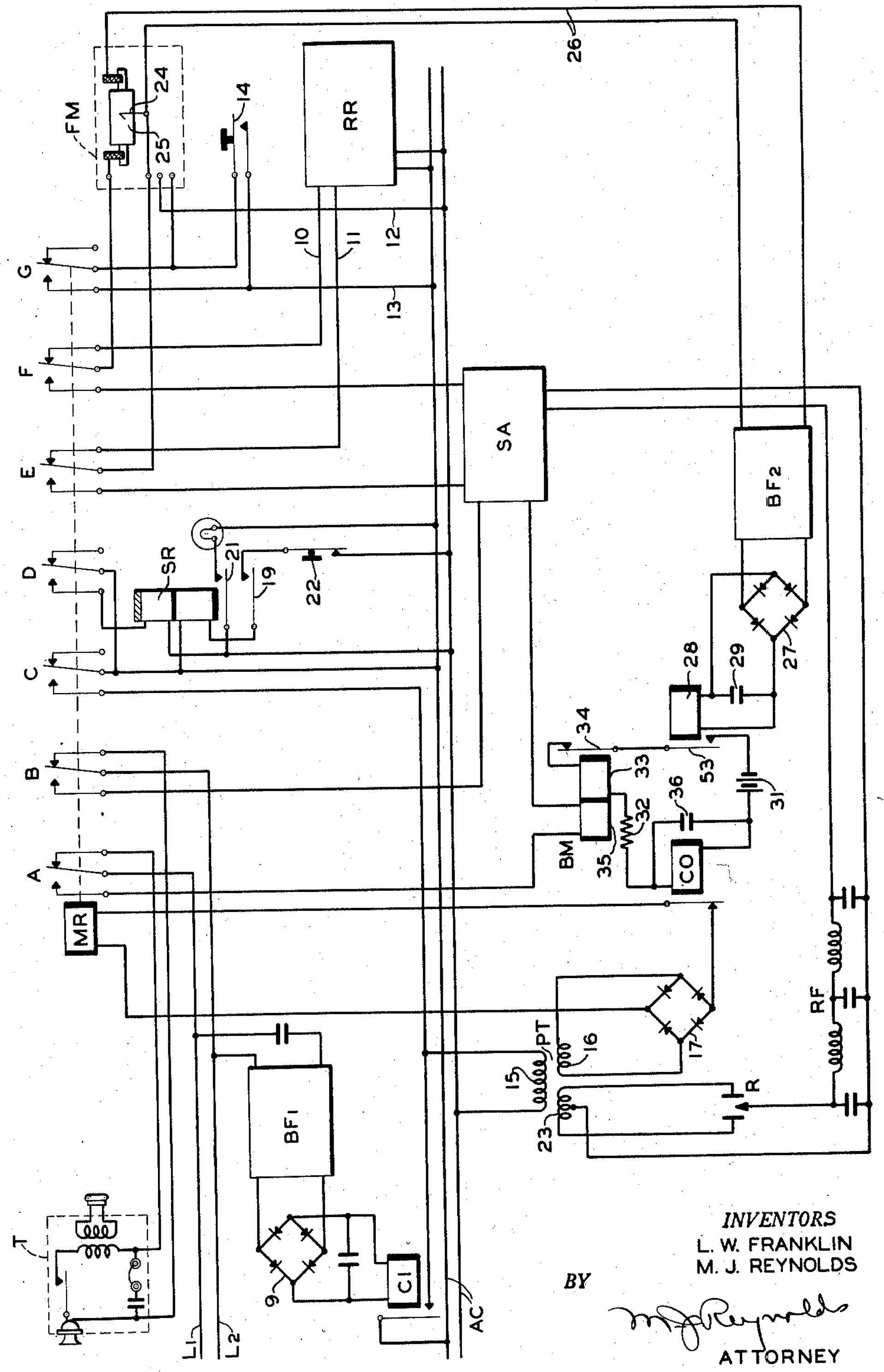
Fig. 1 is a circuit diagram illustrating one embodiment of the invention.

Referring first to Fig. 1 of the drawings, there is shown a facsimile machine FM normally connected to the output of a radio receiver RR by means of the conductors 10 and 11 and the tongues E and F and associated back contacts of the gang or master relay MR. Power for operation of the facsimile machine is normally obtained from the power line AC by means of the conductors 12 and 13 and the manual switch 14.

The telephone line $L_1$—$L_2$ is normally connected to the telephone T through the tongues A and B and associated back contacts of the master relay MR. When it is desired to deliver a telegram to a particular subscriber, the operator at the telegraph office calls the subscriber on the phone in the usual manner. If the subscriber answers, the operator may orally deliver the telegraph message and also, if the subscriber has suitable facsimile equipment, transmit the message over the telephone to the subscriber's facsimile machine, as will hereinafter appear. If the subscriber fails to answer the telephone call, the message may be transmitted to the facsimile apparatus through the following arrangement:

A band pass filter $BF_1$ is connected across the telephone line $L_1$—$L_2$. The output of the filter $BF_1$ is connected to the winding of a cut-in relay CI through a rectifier bridge 9. When it is desired to cut-in the facsimile machine, the operator at the telegraph office calls the desired subscriber's telephone in the usual maner. The operator in the telegraph office receiving no answer from the intended recipient of the telegram, or having previously received an answer and having had transmission of the message requested, sends a predetermined transfer tone signal over the line $L_1$—$L_2$. This signal should be of the frequency to which the filter $BF_1$ is responsive, for instance, 300 cycles. It may be applied to the line $L_1$—$L_2$ by the telegraph attendant either inductively through the induction coil contained in the usual bell box, in the manner set forth in U. S. Patent No. 2,209,327, of d'Humy and Franklin, or it may be applied to the line $L_1$—$L_2$ acoustically, as set forth in U. S. Patent No. 2,209,326, of d'Humy and Franklin, both granted July 30, 1940. The tone signal is transmitted by the filter BF1 whether or not the receiver is off the hook, and actuates the cut-in relay CI. The condenser across the coil of CI is to prevent it from operating on short voice frequencies near 300 cycles. This relay, on being operated, completes a circuit for the primary winding 15 of a power transformer PT, one of the secondary windings 16 of which is connected to the winding of the master relay MR through the rectifier bridge 17, back contact and armature of a cut-out relay CO. Relay MR, on being operated, serves at the tongue C and associated front contact to connect the line AC with the primary winding 15, independently of the relay CI. The engagement of the tongues A and B with their front contacts disconnects the line $L_1$—$L_2$ from the telephone T and from the input of the filter $BF_1$ and connects the line to the input of the signal amplifier SA. The operation of tongue D of relay MR to its front contact completes a circuit from the AC line through the winding of the alternating current relay SR. This relay locks up through its armature 19 and supplies energy to the signal lamp L through its armature 21. Lamp L remains lighted until the relay SR is manually released by the key 22. As a result, the subscriber upon return to his premises is notified that a message has been received in his absence.

The tongues E and F, on leaving their back contacts, disconnect the signal input of the facsimile machine FM from the radio receiver RR and, upon engaging their front contacts, connect the output of the signal amplifier SA to the input of the facsimile machine. The tongue G on engaging its front contact extends the power leads 12 and 13 to the power input of the facsimile machine, irrespective of the operated or unoperated condition of the switch 14. Direct current for operation of the amplifier SA is supplied through the secondary winding 23 of the power transformer PT, rectifier R and ripple filter RF.

The telephone T having been isolated from the line $L_1$—$L_2$, and the facsimile machine FM having been associated therewith through the signal amplifier SA, the telegraph operator may now proceed with the transmission of the facsimile message. However, it is desirable that a check be first made to indicate that the switchover has been successfully completed. For this purpose the operator may transmit a test signal of short duration, as for instance a 100 cycle frequency for a period of three seconds. The signal is repeated at the receiving station by the amplifier SA directly to the stylus and drum 24 and 25, respectively, of the facsimile machine, and thence over conductors 26 to the input of a band pass filter BF2, which is selective to this particular frequency. The tone is repeated by the filter, through a rectifying bridge 27 to the winding of relay 28. A condenser 29, connected across the terminals of the relay 28, delays the operation of the relay 28 so that it will not respond to transient signals of the particular frequency, for which the filter BF2 is tuned, occurring during the transmission of the facsimile message. Prolonged transmission of the indicated frequency effects operation of relay 28, however, and consequent completion of a buzzer circuit from the battery 31, winding of the cutout relay CO, resistance 32, winding 33 of the buzzer magnet BM, buzzer contact 34 and tongue and make contact of relay 28. A secondary winding 35 on the buzzer magnet BM feeds the buzzer frequency as a reply signal to the line $L_1$—$L_2$ through the input circuit of the signal amplifier SA and tongues A and B of the master relay MR. This signal is notification to the facsimile operator that the cutover has been completed and that she may proceed to transmit the message. A condenser 36 across the terminals of the relay CO is designed to time the operation of this relay so that it does not operate within the time limit of the checking signal transmitted for the purpose just described.

Any desired system of facsimile transmission of the deside message may be employed. In the d'Humy and Franklin Patent No. 2,209,326, referred to above, there is shown one method of facsimile transmission over a telephone circuit in which the facsimile signals are transmitted acoustically to the line.

At the completion of the transmission of the facsimile message, the operator may again check to determine the operativeness of the connection to the facsimile machine to insure that the complete message has been received, by again transmitting the checking frequency. This again operates the relay 28 and completes the buzzer circuit as previously described. However, at the completion of the message transmission the operator prolongs the checking frequency for a sufficient period to fully charge the condenser 36 and effect operation of the relay CO, thus opening its contact and interrupting the circuit to the master relay MR, whereupon the latter releases its tongues A to G. The release of tongue C breaks the circuit to the primary winding of the power transformer PT, tongues A and B switch the line $L_1$—$L_2$ back to the telephone T, tongues E and F return the input circuit of the facsimile machine FM back to the output of the radio receiver RR, and tongue G restores the control of the AC power back to the manual switch 14.

The system shown in Fig. 1 is based upon the assumption that the telegraph operator has access to the line $L_1$—$L_2$ during the transmission of the bell ringing current. However, in some telephone systems the calling subscriber's line may not be switched to that of the called subscriber until the receiver is lifted at the called station. In such case a different method of selection of the facsimile machine is required, and in Fig. 2 there is disclosed an arrangement for accomplishing this purpose.

Figure 2:
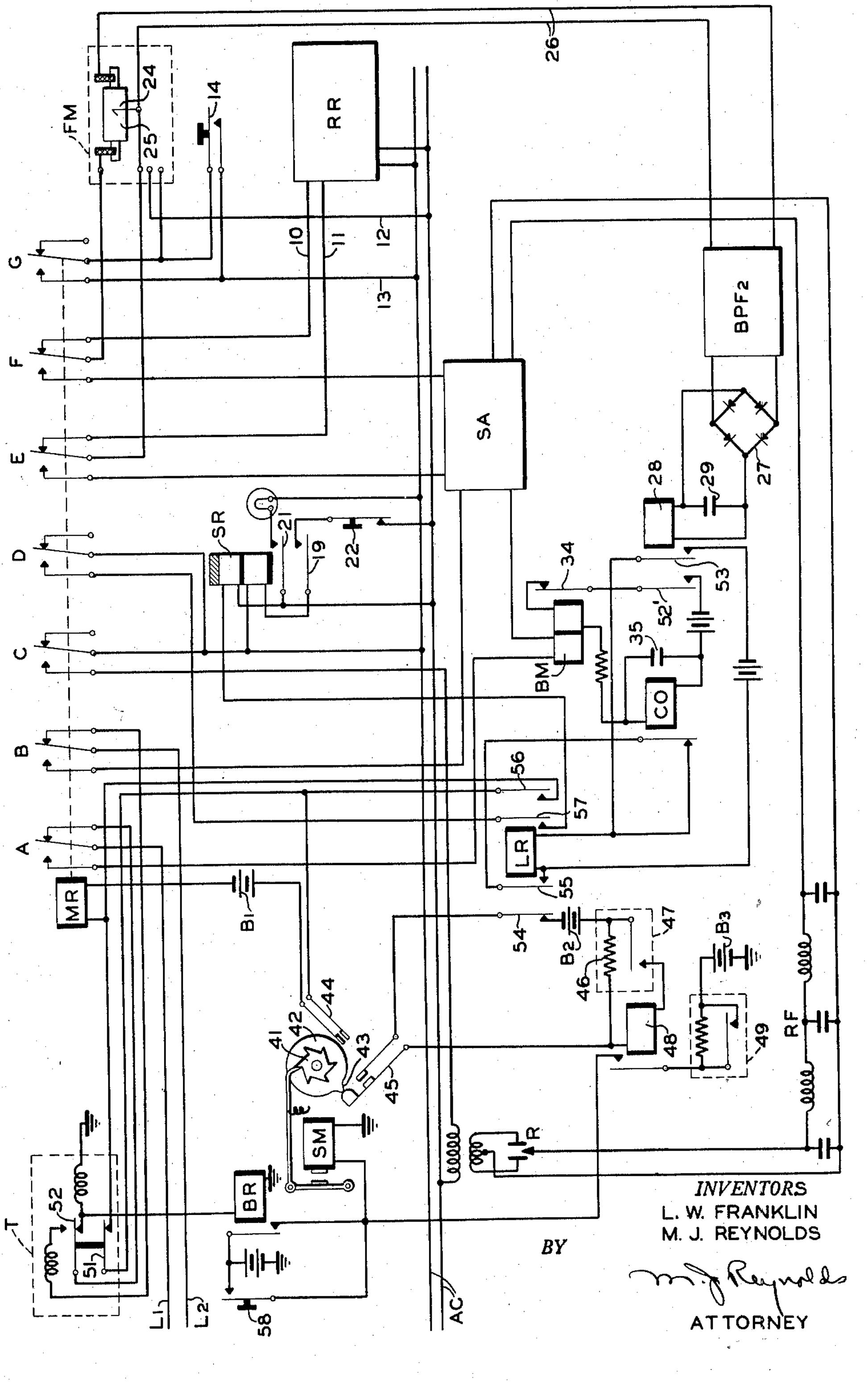
Fig. 2 is a circuit diagram showing a modified selecting scheme.

In the modification of Fig. 2, a relay BR serves to operate a stepping magnet SM arranged to step a ratchet wheel 41 one step for each bell signal received over the line. The arrangement is such that, if the telephone remains unanswered, after a predetermined number of bell signals have been received, the facsimile machine is automatically cut-into the line circuit. For this purpose the magnet SM steps the disc 42 around in response to each bell signal until the cam hump 43 thereon engages and closes the switch 44 to complete a circuit for the master relay MR. Immediately upon operating, this magnet at its tongues A and B removes the relay BR from the line so that the disc 42 is left in the position of holding switch 44 closed. The operation of the master relay MR also disconnects the telephone T from the line $L_1$—$L_2$ and continues the line, through the signal amplifier SA, and tongues E and F and their front contacts, to the facsimile machine, as described in connection with Fig. 1. All of the remaining tongues C to G of master relay MR perform the same functions as in Fig. 1. With the arrangement as shown, it is obvious that any incoming call to the subscriber, whether originating at the telegraph office or not, will cut-in the facsimile machine if the telephone remains unanswered. A contact 45 associated with the cam disc 42 and held open in the normal rest position of the disc is provided for controlling mechanism to again automatically disconnect the facsimile machine from the telephone circuit unless it is locked in by a special signal transmitted by the facsimile telegraph operator. Assume, at the completion of a call with the cam 43 in position to hold the contacts 44 closed, that the call was one which did not originate at the telegraph office and, hence, that no signal was transmitted to lock in the facsimile apparatus. Contacts 45 being closed at this time will complete a circuit through the armature 54 and back contact of the locking relay LR, battery B2, and the heater element 46 of the thermostatic switch 47. After a delay sufficient to operate the thermostatic switch 47 the relay 48 will be energized. The construction of the thermostatic switch 47 is such that it interposes a substantial time delay in the operation of the relay 48, and upon closing of its contacts sufficient current will still be diverted through the heating element 47 to maintain the contacts closed. The operation of relay 48 completes a circuit from battery B3 through the thermostatic flasher switch 49, the armature and front contact of the relay 48, and the winding of the stepping magnet SM to ground. The magnet SM is, therefore, provided with a stepping pulse which advances the cam disc 43 off the contacts 44 and into position to open contacts 45. It comes to rest in this normal position due to the interruption of the circuit to the relay 48 at the contacts 45.

Had the called subscriber responded to the call prior to the closing of the switch 44, the same operation would be effected with the exception that the flasher switch 49 would step the cam disc 42 the required number of steps necessary to complete the rotation of the cam disc to its normal rest position. In order to prevent operation of the relay MR at this time by the passage of the cam 43 past the contacts 44, the circuit to the relay MR is extended through the switch arm 51 associated with the receiver contacts 52 so as to be opened upon lifting of the receiver. If the call is answered after the cam disc has been stepped into position to close contacts 44 so as to have operated the relay MR to disconnect the telephone line from the telephone apparatus, the opening of contact 51 upon lifting the receiver will interrupt the circuit to the relay MR and immediately return the telephone line to the telephone apparatus.

In the case of a call originating at the telegraph office, it is necessary for the telephone operator to lock in the connection of the facsimile apparatus to the telephone line in order to prevent the continued stepping of the disc 43 through the flasher switch 49. This is effected by transmitting a steady tone over the telephone wires in the manner described in connection with Fig. 1. This tone is repeated through the signal amplifier SA, the front contacts and switch tongues E and F and the stylus and drum 24 and 25 of the facsimile recorder and thence by conductors 26 through the band pass filter $BF_2$ to the relay 28. The operation of the relay 28 closes contact 52' to energize the buzzer magnet BM and transmit back the buzzer signal over the telephone wires as previously described. Relay 28 also through its armature 53 and front contact completes the operating circuit for the locking relay LR. This relay at its armature 54 interrupts the circuit to the relay 48, thus preventing operation of the flasher switch 49 and further stepping of the cam disc 42. Relay LR is locked up through its contact 55 and the armature and back contact of the cutout relay CO. The relay LR also has an armature 56, which upon operation to its front contact short circuits the switch 51 in the telephone apparatus so that once the telegraph operator has taken control of the facsimile apparatus, the connection will not be disturbed by lifting of the telephone receiver. The signal lamp L will be operated in the same manner as in connection with Fig. 1, the circuits being modified only by inclusion of the armature 57 and front contact of the relay LR in the energizing circuit for the signal relay SR, thus insuring that the signal will not be operated upon each operation of the master relay MR but only upon such operations thereof as are followed by operation of the locking relay LR in response to the locking in signal originating with the facsimile telegraph operator.

The telegraph operator having locked up the connection to the facsimile machine, transmits the facsimile message in the usual manner and at the end thereof again transmits a steady tone signal for a period sufficient to operate the cutout relay CO as heretofore described. The operation of the relay CO interrupts the locking circuit for the relay LR. This relay is held up, however, at this time by the armature 53 of the relay 28, but upon interruption of the cutout signals and the consequent release of the armature 53, the relay LR becomes deenergized and its locking contact 55 opened. This occurs subsequent to the release of the cutout relay CO due to the slow-to-release action of the condenser 35 in shunt to the winding of relay CO. Shortly after closing of the contact 54 of relay LR, the thermostatic switch 47 is operated to energize relay 48 and thus complete the circuit for the flasher switch 49, which then serves to advance the cam disc 42 off the contacts 44 and in position to open the contact 45, whereupon the disc 42 comes to rest in its normal position.

It should be noted that the aggregate operating time of the thermostatic switch 47 and of the flasher switch 49 must be sufficient to enable the cam 42 to move into position to close the contacts 44, permit the signal amplifier SA to become operative and the relay 28 to respond to the locking tone signal, since otherwise the cam disc 43 would be stepped out of contact with the switch 44 before the relay LR has had an opportunity to lock up. If during the operation of the facsimile recorder in response to a telephone call the calling subscriber should desire to use the telephone or to interrupt the facsimile transmission for any purpose, the circuit may be restored to normal by closing the manual switch 58, thus giving to the stepping magnet SM an impulse for the purpose of advancing the cam disc from the contacts 44 to the contact 45.

It will be obvious that many modifications may be made in the details of the system described without departing from the essential features of the invention, and all such changes as come within the terms of the appended claims are contemplated.

What is claimed is:

1. A receiving station for the selective reception of telephone and facsimile signals transmitted over a telephone channel, comprising a telephone set normally coupled to said channel, a facsimile recorder, switching means connected to the telephone set and facsimile recorder for selectively coupling either said telephone set or said facsimile recorder to said telephone channel, first relay means for operating said switching means, means responsive to a transfer signal received over said telephone channel to energize said first relay means thereby to disconnect said telephone set from said telephone channel and to connect said facsimile recorder to said telephone channel, reply signal generating means coupled to said telephone channel when said first relay means is energized, means responsive to a testing signal received over said telephone channel to energize said reply signal generating means thereby to transmit a reply signal over said telephone channel, and means responsive to reception of said testing signal over said telephone channel for a time interval greater than a predetermined time interval to deenergize said first relay means thereby to operate said switching means and to couple said telephone set to said telephone channel and to disconnect said facsimile recorder from said telephone channel.

2. A receiving station for the selective reception of telephone and facsimile signals transmitted over a telephone channel, comprising a telephone set normally coupled to said channel, a facsimile recorder, switching means for selectively coupling either said telephone set or said facsimile recorder to said telephone channel, first relay means for operating said switching means, means responsive to a transfer signal having a first given frequency and received over said telephone channel to energize said first relay means thereby to disconnect said telephone set from said telephone channel and to connect said facsimile recorder to said telephone channel, reply signal generating means coupled to said telephone channel when said first relay means is energized, means responsive to a testing signal having a second given frequency and received over said telephone channel to energize said reply signal generating means thereby to transmit a reply signal over said telephone channel, and means responsive to reception of said testing signal over said telephone channel for a time interval greater than a predetermined time interval to deenergize said first relay means thereby to operate said switching means and to couple said telephone set to said telephone channel and to disconnect said facsimile recorder from said telephone channel.

3. A receiving station for the selective reception of telephone and facsimile signals transmitted over a telephone channel and facsimile signals transmitted over a radio channel, comprising a telephone set normally coupled to said telephone channel, a facsimile recorder normally coupled to said radio channel, switching means connected to the telephone set and facsimile recorder for selectively coupling either said telephone set or said facsimile recorder to said telephone channel and for disconnecting said facsimile recorder from said radio channel, first relay means for operating said switching means, means responsive to a transfer signal received over said telephone channel to energize said first relay means thereby to disconnect said telephone set from said telephone channel, to connect said facsimile recorder to said telephone channel and to disconnect said facsimile recorder from said radio channel, reply signal generating means coupled to said telephone channel when said first relay means is energized, means including a third relay and responsive to a testing signal received over said telephone channel to energize said reply signal generating means thereby to transmit a reply signal over said telephone channel, and means including a fourth relay and responsive to reception of said testing signal over said telephone channel for a time interval greater than a predetermined time interval to deenergize said first relay means thereby to operate said switching means and to couple said telephone set to said telephone channel, to disconnect said facsimile recorder from said telephone channel and to connect said facsimile recorder to said radio channel.

4. A receiving station for the selective reception of telephone and facsimile signals transmitted over a telephone channel, comprising a telephone set normally coppled to said channel, a facsimile recorder, switching means for selectively coupling either said telephone set or said facsimile recorder to said telephone channel, a first relay for operating said switching means, means including a second relay and responsive to a transfer signal received over said channel for energizing said first relay thereby to disconnect said telephone set from said telephone channel and to connect said facsimile recorder to said telephone channel, means including a pair of normally open contacts operated upon energization of said first relay to lock said first relay in the energized condition thereof, reply signal generating means coupled to said telephone channel when said first relay is energized, means including a third relay and responsive to a testing signal received over said telephone channel to energize said reply signal generating means thereby to transmit a reply signal over said telephone channel, means including a fourth relay and responsive to the reception of said testing signal over said telephone channel for a time interval greater than a predetermined time interval to unlock and deenergize said first relay thereby to operate said switching means and to disconnect said facsimile recorder from said telephone channel and to couple said telephone set to said telephone channel.

5. A receiving station for the selective reception of telephone and facsimile signals transmitted over a telephone channel, comprising a telephone set normally coupled to said channel, a facsimile recorder, switching means for selectively coupling either said telephone set or said facsimile recorder to said telephone channel, a first relay for operating said switching means, means including a second relay and responsive to a transfer signal having a first given frequency and received over said channel for energizing said first relay thereby to disconnect said telephone set from said telephone channel and to connect said facsimile recorder to said telephone channel, means including a pair of normally open contacts operated upon energization of said first relay to lock said first relay in the energized condition thereof, reply signal generating means coupled to said telephone channel when said first relay is energized, means including a third relay and responsive to a testing signal having a second given frequency and received over said telephone channel to energize said reply signal generating means thereby to transmit a reply signal over said telephone channel, means including a fourth cut-out relay and responsive to the reception of said testing signal over said telephone channel for a time interval greater than a predetermined time interval to unlock and deenergize said first relay thereby to operate said switching means and to disconnect said facsimile recorder from said telephone channel and to couple said telephone set to said telephone channel.

6. A receiving station for the selective reception of telephone and facsimile signals transmitted over a telephone channel, comprising a telephone set normally coupled to said channel, a facsimile recorder, switching means for selectively coupling either said telephone set or said facsimile recorder to said telephone channel, a first relay for operating said switching means, means including a second relay and a first band pass filter tuned to a first given frequency and responsive to a transfer signal having said first frequency and received over said channel for energizing said first relay thereby to disconnect said telephone set from said telephone channel and to connect said facsimile recorder to said telephone channel, means including a pair of normally open contacts operated upon energization of said first relay to lock said first relay in the energized condition thereof, reply signal generating means comprising a buzzer coupled to said telephone channel when said first relay is energized, means including a third relay and a second band pass filter tuned to a second given frequency and responsive to a testing signal having said second frequency and received over said telephone channel to energize said reply signal generating means thereby to transmit a reply signal over said telephone channel, means including a fourth relay, said third relay and said second band pass filter, said means being responsive to the reception of said testing signal over said telephone channel for a time interval greater than a predetermined time interval, to unlock and deenergize said first relay thereby to operate said switching means and to disconnect said facsimile recorder from said telephone channel and to couple said telephone set to said telephone channel.

7. A receiving station for the selective reception of telephone and facsimile signals transmitted over a telephone channel and facsimile signals transmitted over a radio channel, comprising a telephone set normally coupled to said channel, a facsimile recorder normally coupled to said radio channel, switching means for selectively coupling either said telephone set or said facsimile recorder to said telephone channel and for disconnecting said facsimile recorder from said radio channel, a first relay for operating said switching means, means including a second relay and responsive to a transfer signal received over said telephone channel for energizing said first relay thereby to disconnect said telephone set from said telephone channel, to connect said facsimile recorder to said telephone channel and to disconnect said facsimile recorder from said radio channel, means including a pair of normally open contacts operated upon energization of said first relay to lock said first relay in the energized condition thereof, reply signal generating means coupled to said telephone channel when said first relay is energized, means including a third relay and responsive to a testing signal received over said telephone channel to energize said reply signal generating means thereby to transmit a reply signal over said telephone channel, means including a fourth relay and responsive to the reception of said testing signal over said telephone channel for a time interval greater than a predetermined time interval, to unlock and deenergize said first relay thereby to operate said switching means and to disconnect said facsimile recorder from said telephone channel, to couple said facsimile recorder to said radio channel and to couple said telephone set to said telephone channel.

8. A receiving station for the selective reception of telephone and facsimile signals transmitted over a telephone channel, comprising a telephone set normally coupled to said channel, a facsimile recorder, switching means for selectively coupling either said telephone set or said facsimile recorder to said channel, a first relay for operating said switching means, an energizing circuit for said first relay including a pair of normally open contacts, a counting device having a home position and a plurality of other positions, said counting device closing said normally open contacts in one of said other positions thereof thereby to energize said first relay and to disconnect said telephone set from said channel and to couple said facsimile recorder to said channel, means responsive to a periodic transfer signal received over said channel to cause said counting device to shift from said home position thereof to said one other position thereof, control means operative a first predetermined time interval after shifting of said counting device from said home position thereof to operate said stepping means to return said counting device to said home position thereof thereby to open said energizing circuit for said first relay, means responsive to a testing signal received over said channel to disable said control means thereby to permit said counting device to rest in said one other position thereof, reply signal generating means coupled to said channel, means including a second relay and responsive to said testing signal received over said channel to energize said reply signal generating means thereby to transmit a reply signal over said channel, means including a third relay and responsive to the reception of said testing signal over said channel for a time interval greater than a second predetermined time interval to operate said control means thereby to shift said counting device from said one other position thereof to said home position thereof, said latter shifting of said counting device causing opening of said energizing circuit for said first relay thereby to operate said switching means to disconnect said facsimile recorder from said channel and to couple said telephone set to said channel.

9. A receiving station for the selective reception of telephone and facsimile signals transmitted over a telephone channel, comprising a telephone set normally coupled to said channel, a facsimile recorder, switching means for selectively coupling either said telephone set or said facsimile recorder to said channel, a first relay for operating said switching means, an energizing circuit for said first relay including a pair of normally open contacts, a cam having a home position and a plurality of other positions, said cam closing said normally open contacts in one of said other positions thereof thereby to energize said first relay and to disconnect said telephone set from said channel and to couple said facsimile recorder to said channel, stepping means responsive to a periodic transfer signal received over said channel to step said cam from said home position thereof to said one other position thereof, control means operative a first predetermined time interval after stepping of said cam from said home position thereof to operate said stepping means to return said cam to said home position thereof thereby to open said energizing circuit for said first relay, means responsive to a testing signal received over said channel to disable said control means thereby to permit said cam to rest in said one other position thereof, reply signal generating means coupled to said channel, means including a second relay and responsive to said testing signal received over said channel to energize said reply signal generating means thereby to transmit a reply signal over said channel, means including a third relay and responsive to the reception of said testing signal over said channel for a time interval greater than a second predetermined time interval to operate said control means thereby to step said cam from said one other position thereof to said home position thereof, said latter stepping of said cam causing opening of said energizing circuit for said first relay thereby to operate said switching means to disconnect said facsimile recorder from said channel and to couple said telephone set to said channel.

10. A receiving station for the selective reception of telephone and facsimile signals transmitted over a telephone channel, comprising a telephone set normally coupled to said channel, a facsimile recorder, switching means for selectively coupling either said telephone set or said facsimile recorder to said channel, a first relay for operating said switching means, an energizing circuit for said first relay including a pair of normally open contacts, a cam having a home position and a plurality of other positions, said cam closing said normally open contacts in one of said other positions thereof thereby to energize said first relay and to disconnect said telephone set from said channel and to couple said facsimile recorder to said channel, stepping means responsive to a periodic ringing signal received over said channel to step said cam from said home position thereof to said one other position thereof, control means operative a first predetermined time interval after stepping of said cam from said home position thereof to operate said stepping means to return said cam to said home position thereof thereby to open said energizing circuit for said first relay, means responsive to a testing signal having a frequency different from the frequency of said ringing signal and received over said channel to disable said control means thereby to permit said cam to rest in said one other position thereof, reply signal generating means coupled to said channel, means including a second relay and responsive to said testing signal received over said channel to energize said reply signal generating means thereby to transmit a reply signal over said channel, means including a third relay and said second relay and responsive to the reception of said testing signal over said channel for a time interval greater than a second predetermined time interval to operate said control means thereby to step said cam from said one other position thereof to said home position thereof, said latter stepping of said cam causing opening of said energizing circuit for said first relay thereby to operate said switching means to disconnect said facsimile recorder from said channel and to couple said telephone set to said channel.

11. A receiving station for the selective reception of telephone and facsimile signals transmitted over a telephone channel, comprising a telephone set normally coupled to said channel, a facsimile recorder, switching means for selectively coupling either said telephone set or said facsimile recorder to said channel, a first relay for operating said switching means, an energizing circuit for said first relay including a pair of normally open contacts, a cam having a home position and a plurality of other positions, said cam closing said normally open contacts in one of said other positions thereof thereby to energize said first relay and to disconnect said telephone set from said channel and to couple said facsimile recorder to said channel, stepping means responsive to a periodic transfer signal received over said channel to step said cam from said home position thereof to said one other position thereof, means responsive to the stepping to said one other position of said cam to suppress operation of said stepping means, thermostatic control means energized upon the stepping of said cam from said home position thereof and operative a first predetermined time interval after energization thereof to operate said stepping means to return said cam to said home position thereof thereby to open said energizing circuit for said first relay, means responsive to a testing signal received over said channel to disable said control means thereby to permit said cam to rest in said one other position thereof, reply signal generating means coupled to said channel, means including a second relay and responsive to said testing signal received over said channel to energize said reply signal generating means thereby to transmit a reply signal over said channel, means including a third relay and responsive to the reception of said testing signal over said channel for a time interval greater than a second predetermined time interval to operate said control means thereby to step said cam from said one other position thereof to said home position thereof, said latter stepping of said cam causing opening of said energizing circuit for said first relay thereby to operate said switching means to disconnect said facsimile recorder from said channel and to couple said telephone set to said channel.

12. A receiving station for the selective reception of telephone and facsimile signals transmitted over a telephone channel and facsimile signals received over a radio channel, comprising a telephone set normally coupled to said telephone channel, a facsimile recorder normally coupled to said radio channel, switching means for selectively coupling either said telephone set or said facsimile recorder to said telephone channel and for disconnecting said facsimile recorder from said radio channel, a first relay for operating said switching means, an energizing circuit for said first relay including a pair of normally open contacts, a cam having a home position and a plurality of other positions, said cam closing said normally open contacts in one of said other positions thereof thereby to energize said first relay and to disconnect said telephone set from said telephone channel, to couple said facsimile recorder to said telephone channel and to disconnect said facsimile recorder from said radio channel, stepping means responsive to a periodic transfer signal received over said telephone channel to step said cam from said home position thereof to said one other position thereof, control means operative a first predetermined time interval after stepping of said cam from said home position thereof to operate said stepping means to return said cam to said home position thereof thereby to open said energizing circuit for said first relay, means responsive to a testing signal received over said telephone channel to disable said control means thereby to permit said cam to rest in said one other position thereof, reply signal generating means coupled to said telephone channel, means including a second relay and responsive to said testing signal received over said telephone channel to energize said reply signal generating means thereby to transmit a reply signal over said telephone channel, means including a third relay and responsive to the reception of said testing signal over said telephone channel for a time interval greater than a second predetermined time interval to operate said control means thereby to step said cam from said one other position thereof to said home position thereof, said latter stepping of said cam causing opening of said energizing circuit for said first relay thereby to operate said switching means to disconnect said facsimile recorder from said telephone channel, to couple said telephone set to said telephone channel and to couple said facsimile recorder to said radio channel.

13. A receiving station for the selective reception of telephone and facsimile signals transmitted over a telephone channel comprising a telephone set normally connected to said channel, a facsimile recorder, switching means connected to the telephone set and to the facsimile recorder for selectively coupling either the telephone set or facsimile recorder to said telephone channel, said switching means including means to energize the facsimile recorder when said recorder is connected to the telephone channel, means responsive to a single transfer signal received over said telephone channel to actuate said switching means to disconnect said telephone set from the telephone channel and to connect the facsimile recorder thereto.

14. A receiving station for the selective reception of telephone and facsimile signals transmitted over a telephone channel comprising a telephone set normally connected to said channel, a facsimile recorder, switching means connected to the telephone set and to the facsimile recorder, said switching means including means for selectively coupling the telephone set and facsimile recorder to the telephone channel, means connecting the facsimile recorder to a local source of power when said recorder is connected to the telephone channel, means responsive to a transfer signal having a given constant frequency and received over said telephone channel to actuate said switching means whereby the telephone set is disconnected from the telephone channel and the facsimile recorder is connected thereto.

15. A receiving station for the selective reception of telephone and facsimile signals transmitted over a telephone channel comprising a telephone set normally connected to said channel, a facsimile recorder, switching means connected to the telephone set and to the facsimile recorder, said switching means including means for selectively coupling the telephone set and facsimile recorder to the telephone channel, means connecting the facsimile recorder to a local source of power when said recorder is connected to the telephone channel, means responsive to a transfer signal having a given constant frequency and received over said telephone channel to actuate said switching means whereby the telephone set is disconnected from the telephone channel and the facsimile recorder is connected thereto, said means responsive to a transfer signal including a tuned circuit adapted to be coupled to the telephone channel, relay means connected to said tuned circuit and circuit means intercoupling said relay means and said switching means.

References Cited in the file of this patent

UNITED STATES PATENTS

| | | |
|---|---|---|
| 2,282,461 | Dillenback | May 12, 1942 |
| 2,314,471 | Wright | Mar. 23, 1943 |
| 2,347,477 | Halstead | Apr. 25, 1944 |
| 2,402,083 | Reid | June 11, 1946 |
| 2,501,091 | Preston et al. | Mar. 21, 1950 |
| 2,529,264 | Ridings | Nov. 7, 1950 |
| 2,554,153 | Phelps | May 22, 1951 |

FOREIGN PATENTS

| | | |
|---|---|---|
| 509,046 | Great Britain | July 10, 1939 |